United States Patent [19]

Sauvageau et al.

[11] Patent Number: 4,697,323

[45] Date of Patent: Oct. 6, 1987

[54] TOOL FOR ARCHERY BOW CUSHION PLUNGER AND FOR ARROW NOCKS

[76] Inventors: Guy Sauvageau, 12064 L'Acadie Blvd., Montreal, Canada, H3M 2T9; Marcel Sauvageau, 16,125 Demers Street, St-Hyacinthe, Canada, J2T 3V4

[21] Appl. No.: 835,872

[22] Filed: Mar. 3, 1986

[51] Int. Cl.⁴ .............................................. B23P 19/04

[52] U.S. Cl. ...................................................... 29/264

[58] Field of Search ................. 29/256, 259, 263, 264; 7/138, 170; 81/90 C

[56] References Cited

U.S. PATENT DOCUMENTS

| | | | |
|---|---|---|---|
| 1,895,448 | 1/1933 | Cornwehl | 29/264 |
| 4,194,278 | 3/1980 | Sanders | 29/264 |
| 4,392,264 | 7/1983 | Booe | 7/138 |

FOREIGN PATENT DOCUMENTS

| | | | |
|---|---|---|---|
| 758788 | 5/1957 | Canada . | |
| 597613 | 4/1928 | France | 29/264 |

*Primary Examiner*—Robert C. Watson

[57] ABSTRACT

A tool for immobilizing the head of the cushion plunger of an archery bow, without having to remove the former from the bow. The tool comprises a cylindrical member which is attachable to the rear portion of the cushion plunger after the closure cap of the latter is removed. The cylindrical member is made with a bore and a rod extending through the bore and forwardly thereof, being rigidly secured at its rear end to the cylindrical member. The tool is attached to the cushion plunger so that the rod immobilizes the plunger element by pressing against it. The tool can also be used to install two different sizes of archery nocks by use of two different openings at the other end of the tool.

8 Claims, 7 Drawing Figures

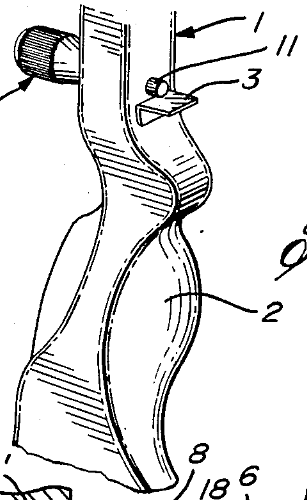
Fig. 1
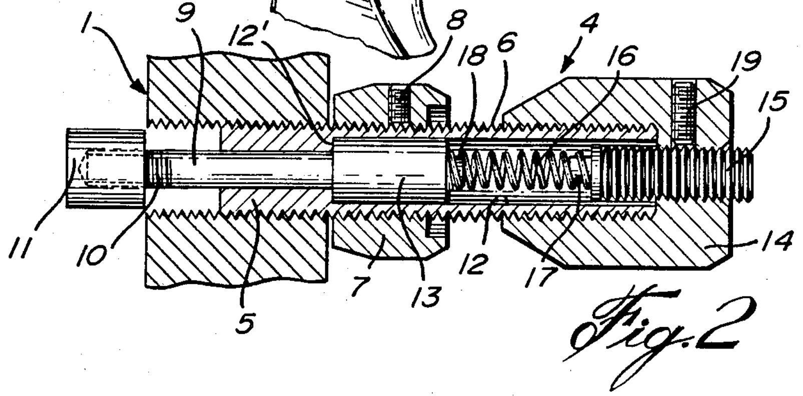
Fig. 2
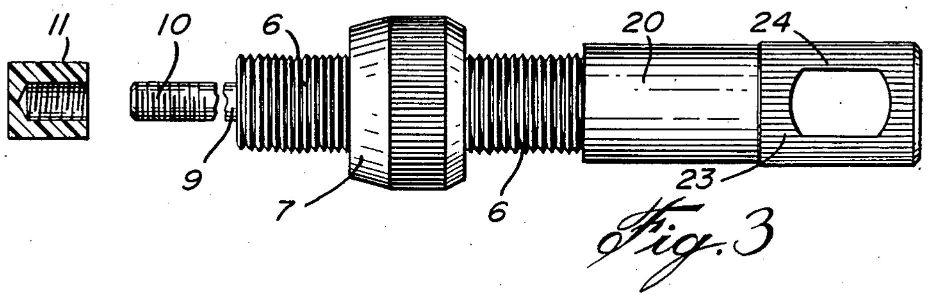
Fig. 3
Fig. 4
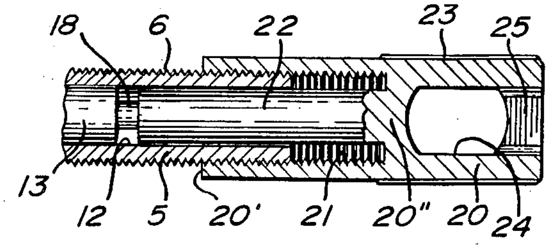

Fig. 5
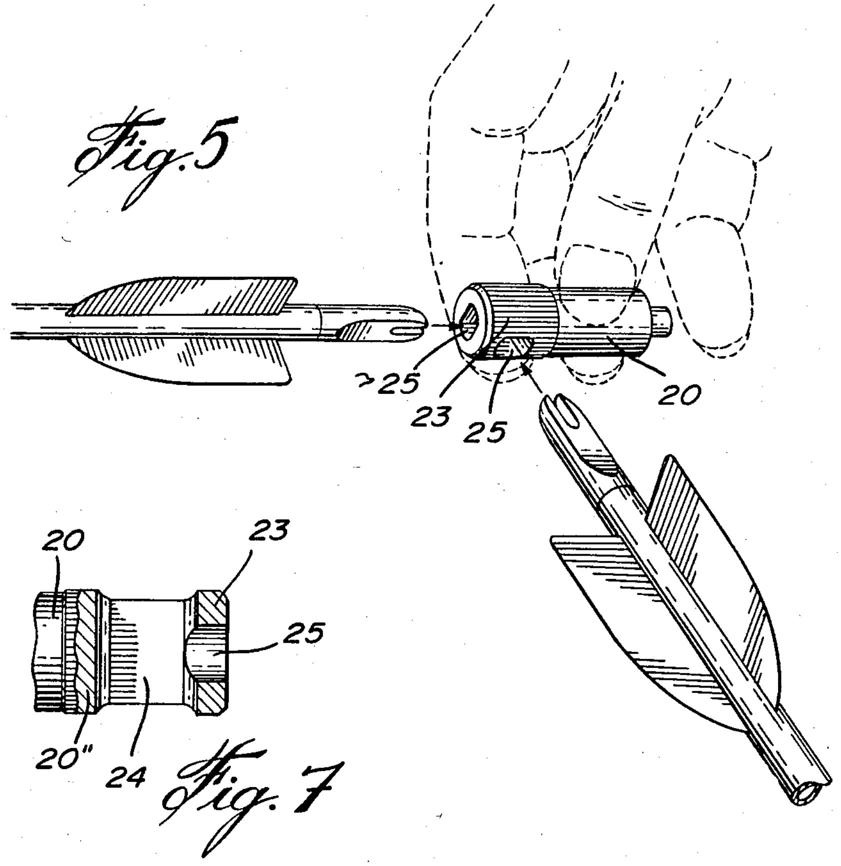
Fig. 7
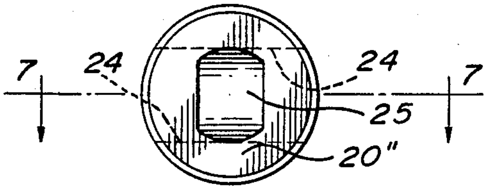
Fig. 6

TOOL FOR ARCHERY BOW CUSHION PLUNGER AND FOR ARROW NOCKS

1. Field of the Invention

This invention pertains generally to archery, more specifically to a new tool which facilitates repairs and installation of the head of a standard balance element which forms part of the equipment of a modern archer's bow.

2. Background of the Invention

State of the art bows as used in the sport of archery include a balance element positioned just above and transversely of the arrow support. The function of the balance element is to minimize vibration of the arrow as it is released. A common example of such a balance element is known as a cushion plunger. The latter is typically formed of a hollow cylindrical dowel extending transversely through the central portion of the bow. The operative end of the cushion plunger has a head which may slide transversely and at a right angle to the arrow, being connected to other elements in the dowel. As an arrow is released by the archer, its vibrations are dampened by the movable head with which it is in contact.

Such a cushion plunger effectively fulfills its purpose, but the head becomes loose or damaged over time.

Till now, the only way to replace a damaged head has been to remove the entire cushion plunger from the bow, which is complicated and time-consuming.

Hence, there is a need for a more simple way to replace a loose or damaged head. However, there is another problem involved in replacing a worn-out head: the latter is screwed on to a plunger shaft element which is covered with teflon to keep friction at a minimum as the head moves back and forth. It is very easy to damage the teflon coating when removing the head, so that extra care must be taken.

OBJECTS OF THE INVENTION

In view of the above it is the prime object of the instant invention to provide a tool adapted to allow quick removal of the head of the balance element of an archery bow and which overcomes the above-mentioned disadvantages.

It is another object of the invention to provide a tool of the character described which is very simple in design and which can also be used to install a nock at the end of an arrow.

SUMMARY OF THE INVENTION

The above and other objects and advantages of the present invention are realized according to a preferred embodiment comprising a cylindrical member closed at one end and opened at its opposite end. The cylindrical member is formed with an internally-threaded bore beginning at its opened end and extending into a major portion of the cylindrical member, terminating short of the closed end.

A rigid elongated rod element is fixedly secured at one of its ends to the closed end portion of the cylindrical member. The other end of the rod element extends through the bore outwardly of the opened end of the cylindrical member a predetermined distance.

The tool is adapted for use specifically with a cushion plunger. The latter consists of a elongated externally-threaded dowel which is screwed transversely into the "window" portion of the bow just above the handle. Lock means are provided to keep the dowel in such position.

The front or operative end of the dowel carries the plunger shaft mentioned above. A large bore extends through the dowel. Slidably located in the large bore is a plunger which is rigidly attached at its front end to the plunger shaft. Biasing means are provided, as is known, to resiliently maintain the plunger and plunger shaft in a forward position. The biasing means constitutes part of a cap closure means provided at the rear end of the dowel member.

The tool according to the invention is used thusly:

(a) the cap closure means is removed from the dowel;

(b) the cylindrical member is screwed onto the dowel, its internal threading matching the external threading of the dowel. In such locking position the rod element of the tool immobilizes the plunger by abutting the rear face of the latter so that the head of the cushion plunger can be easily tightened or removed for replacement as desired.

Preferably the cylindrical member has an extension at its closed end, and this extension has an axial bore and a transverse bore of different sizes shaped to receive and fit two different sizes of archery nocks to install the latter at the rear end of arrows.

BRIEF DESCRIPTION OF THE DRAWINGS

The above will be more clearly understood by having reference to the preferred embodiment of the invention, illustrated by the way of the accompanying drawings, in which:

FIG. 1 is a perspective view of the central area of a bow provided with a cushion plunger just above the arrow support;

FIG. 2 is an enlarged longitudinal section of the cushion plunger of FIG. 1, as installed on the bow shown in cross-section;

FIG. 3 is an elevational view of the cushion plunger, showing the tool of the invention in the place of the cap closure means, also showing the head in section;

FIG. 4 is a longitudinal section view of the rear portion of the dowel and the tool of the invention screwed thereon;

FIG. 5 is a perspective view of the tool and of part of two arrows of different sizes, the nock of which is to be inserted into the tool bores;

FIG. 6 is a rear end view of the tool; and

FIG. 7 is a section taken along line 7—7 of FIG. 6.

Like numerals indicate like elements throughout the drawings.

DETAILED DESCRIPTION OF THE PREFERRED EMBODIMENT

FIG. 1 depicts the central portion of an archery bow 1, including a hand grip 2, arrow support 3 and a balance element of the cushion plunger type 4. The latter is best seen in FIG. 2 and comprises: a cylindrical dowel 5 having external threading 6 adapted to be screwed into a matingly threaded bore extending transversely through bow 1; a removable lock nut 7 constituting the lock means is adjustably positionable and threaded around dowel 5, being held in a desired position by a set screw 8, as is known.

Dowel 5 is formed with a front small diameter bore, through which extends a plunger shaft 9, which is coated with teflon. The outer end of shaft 9 has external threading 10 which retains a head 11, usually made of plastic and which must be rotated relative to plunger shaft 9 to be screwed on or unscrewed fron threading 10.

Dowel 5 is further formed with a large diameter bore 12 which communicates with the rear of the small diameter bore and extends to the rear end of the dowel, opening out thereat. Bore 12 contains a plunger 13 which is rigidly attached to the rear end of plunger shaft 9. Plunger 13 has a greater diameter than plunger shaft 9.

Thus head 11 may move between a rearmost limit position (not shown) and a frontmost second limit position wherein plunger 13 abuts against the shoulder 12' defined at the juncture of the two bores.

The cushion plunger is completed by a closure cap 14 which has an internally threaded bore adapted to screw onto the rear portion of dowel 5. This internally threaded bore communicates with a second intermediate diameter internally-threaded bore defining a hole at the rear end of the cap. The second bore receives a complementarily-threaded screw 15, the forward end of which extends into the large diameter bore of dowel 5. Cap 14 can be adjustably positioned along screw 15 and secured in adjusted position by a set screw 19.

The biasing means for the plunger 13 and its shaft 9 consists simply of a compression spring 16 having one end abutting plunger 13 and the other end abutting screw 15. Both screw 15 and plunger 13 are provided with protuberances 17, 18, respectively to prevent spring 16 from slipping radially. The desired compressive force is obtained by turning cap 14 on dowel 5.

It will be readily appreciated that replacement of head 11 requires preventing rotation of shaft 9 and that it takes excessive time to remove dowel 5 from the bow; also care must be taken not to mar the teflon surface of plunger shaft 9.

The tool of the invention solves these problems and is embodied by: a cylindrical member 20 having an open front end 20' and a closed rear end 20''. Front end 20' leads into an internally threaded bore 21 extending along a major portion of the length of the cylindrical member and which corresponds matingly to the external threading of dowel 5 so that the tool is screwable onto the rear end of dowel 5 after cap 14 and its screw 15 and also spring 16 are removed.

A rigid elongated rod element 22, of the same diameter as plunger 13 is fixedly secured to the rear portion of cylindrical member 20 and extends through bore 21 forwardly outwardly of the same for a relatively short distance.

Thus, removing cap 14 and spring 16 allows the tool to be screwed onto dowel 5, with rod 22 immobilizing plunger 13 against the shoulder 12'. Hence, plunger shaft 9 is also locked against rotation so that head 11 can be rotated relative to plunger shaft 9 to enable its removal and replacement by a new head, depending on its condition.

Preferably, cylindrical member 20 has a rear axial extension 23 which extends from closed end 20'' and which is formed with longitudinal serrations to make it easier to grasp and rotate.

Extension 23 is provided with a transverse through bore 24 and with an axial end bore 25 of the same shape but of smaller size than through bore 24. Bores 24, 25 are adapted to matingly receive a larger size standard arrow nock 26 and a smaller size standard arrow nock 27 to be rotated by the tool relative to an arrow butt portion 28. These nocks are difficult to grasp and usually made of plastic and have a friction fit on the arrow butt portion. The tool facilitates their removal and fitting because it acts as a key to rotate the nock relative to the arrow.

What we claim is:

1. For use with an archery bow conventional cushion plunger having a head, a locking tool adapted to facilitate removal of the head; said cushion plunger including an externally-threaded hollow dowel having a stepped bore defining a large diameter rear bore portion and a smaller diameter front portion with a rearwardly-facing step defining the junction of said two bore portions, a plunger slidable in said rear bore portion, a plunger shaft rigidly attached to the front end of said plunger slidable in said front bore portion, and extending outwardly of the front end of said dowel; said head being screwed to the front end of said plunger shaft; further including a closure cap screwed on the rear end of said dowel and biasing means extending between said plunger and closure cap within said rear bore portion; said tool comprising a cylindrical member having a closed rear end and formed with an internally-threaded bore beginning at its open front end and extending along a major portion thereof; said internally-threaded bore being adapted to screw onto the externally-threaded dowel at the rear portion of the dowel; the bore of said cylindrical member having extending therethrough a rigid rod element rigidly secured to said closed rear end coaxial with said cylindrical member and projecting outwardly of said front end of the cylindrical member a predetermined distance, whereby removing said closure cap and biasing means and screwing said cylindrical member in its place forces said rod free end against the rear face of said plunger to immobilize the latter against said step thereby allowing the head to be rotated relative to said plunger shaft, said cylindrical member further defining a rear axial cylindrical extension provided with at least one bore shaped to receive an arrow nock with flattened sides, whereby the tool can also be used as a key to rotate the nock relative to an arrow butt.

2. A locking tool as defined in claim 1, wherein said cylindrical member has a rear axial cylindrical extension formed with serrations.

3. A locking tool as defined in claim 1, wherein said bore is a through bore transverse to said extension and further including an axial bore at the end face of said extension communicating with said through bore of the same shape but smaller size.

4. A locking tool for use with an archery bow cushion plunger, the latter comprising: a cylindrical dowel having an exterior threading and adapted to be screwingly engaged at one end into a transverse threaded bore of an archery bow, said dowel defining a main bore portion and a diametrally smaller axial bore portion at said one end thereof; an annular flat seat defined by the junction of said two bore portions; a shaft member defining a main stem, slidingly engaging said dowel smaller axial bore portion, and a diametrally larger stem portion slidingly engaged into said dowel main bore portion, and flatly abuttable against said seat, said shaft member having a threaded end portion projecting outwardly from said dowel, a cylindrical head having an axial threaded cavity releasably screwed to said shaft threaded end portion; said locking device consisting of: a cylindrical cap having an axial threaded cavity screwingly releasably engaged with said dowel exterior threading, said cap defining a mouth at one end and a transverse wall inwardly spaced from said mouth, a rod integral with said wall axially projecting from said cylindrical cap through said mouth and therebeyond and terminating in a transversely flat free end surface; whereby, upon screwing said cap along said dowel, said rod free end surface abuts against said diametrally larger stem portion of said shaft member and pushes said stem portion against said seat, so that said shaft member be frictionally locked against rotation, whereby said head may thereafter be unscrewed.

5. A locking tool as in claim 4, wherein said cylindrical cap includes an integral axial extension opposite said mouth, facilitating rotation of said cap.

6. A locking tool as in claim 5, wherein said extension is provided with a transverse through-bore of such shape as to be adapted to matingly receive a larger size arrow nock, to be rotated by the tool relative to an arrow butt portion, whereby said locking tool is further used as a key to remove said nock.

7. A locking tool as in claim 6, wherein said extension is further provided with an axial end bore similar to but smaller than said extension transverse throughbore, said axial end bore adapted to matingly receive a smaller-size arrow nock, to be rotated by the tool relative to another arrow butt portion.

8. A locking device as in claim 5, wherein said extension is cylindrical and is longitudinally knurled on its exterior face, for facilitating rotation of the locking tool on the dowel by hand.

* * * * *